3,199,817
SOIL-SOAKER HOLD-DOWN
Ray Fox, Rte. 1, Box 404, Ord Bend, Calif.
Filed Aug. 6, 1963, Ser. No. 300,247
3 Claims. (Cl. 248—87)

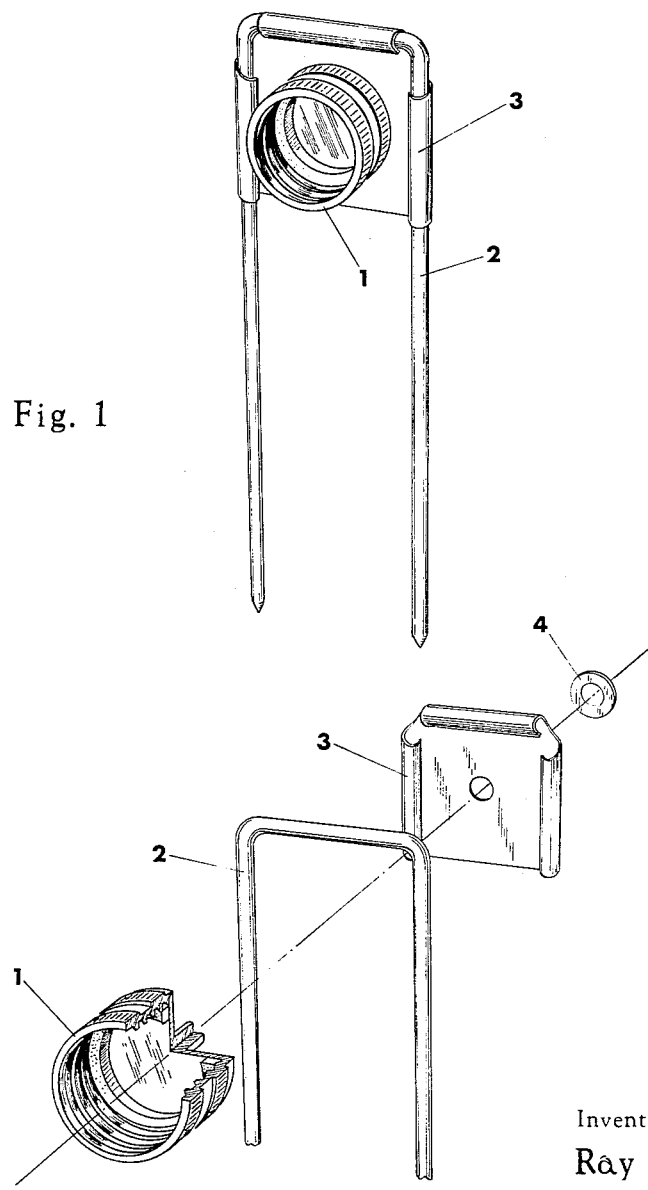

Be it known that I have invented a hold-down for a soil-soaker or lawn-sprinkler which is believed to be original in its design and unique in its use. The make-up of the hold-down is shown in the accompanying drawings which are made a part of this application.

This invention relates to a device designed for the purpose of stationing the end of a soil-soaker or flexible lawn sprinkler-soaker so that the area of watering may the more surely be determined. Usually, in the use of soil- or lawn sprinkler-soakers, the least movement of the soaker or sprinkler-soaker, once it has been placed out for use, moves it out of position.

Frequently, also, when first positioning the long lawn sprinkler-soaker out for use, the far end is cold and stiff and does not remain in a flat, usable position. On such a occasion it turns over on its side causing the spray to dig into the lawn or to hamper the proper flow and direction of the spray. This hold-down invention overcomes this by being a firm, fixed end-piece to the sprinkler-soaker so that it remains in proper position and place for use.

In the use of present soal- or sprinkler-soakers, it is difficult to roll them up for neat and easy storage because, with the least unsupported movement, the center area of the coiled sprinkler-soaker falls out, causing an annoying mess. With the prongs of this new hold-down invention being separated or spaced sufficiently wide enough to receive the flat sides of the soaker, they help materially in keeping the center coils in place when the sprinkler is wound up.

With most watering inventions the sprinkler or diffusing devices are frequently removed from the hose or sprinkler because of their ungainly size and shape; this causes them to be lost or misplaced, frequently. This invention is the better and the more conveniently left attached to the soaker or the sprinkler where it is useful in preventing center fall-out and is, thereby, always available for use. It is of such conforming size and shape that it may easily, and should, for a unit with the soaker or sprinkler when cartoned or packaged for sale by the manufacturer.

Most devices for watering a lawn or other earth areas are for the passage of water through them whereby it is diffused or leaked over the area. This invention is a stop where the water is backed up in the soaker or sprinkler and it is the soaker or the sprinkler which does the water diffusing. No water passes through this device, and it cannot become clogged or otherwise made inoperative.

This device has no working or moving parts to go wrong or get out of order, and is so simply constructed as to be easily and economically repaired, or even made, by the modest mechanic. Commercial manufacture is simple and economic.

This invention is so compactly made that it is easily handled and used by the smallest or youngest user without harm, and it may be stored in modest space by the merchant for separate or unattached sale.

A more complete understanding of the construction and uses of this new invention may be had by reference to the accompanying drawings in which:

FIGURE 1 shows the soaker-sprinkler hold-down as a complete unit ready to be affixed to the end of a soaker or sprinkler so that the prongs may be inserted into the ground to hold the soaker or sprinkler at the place desired.

FIGURE 2 shows an exploded picture of the hold-down wherein the various parts are numbered.

1 denotes the cap of the hold-down which, being adjustable, it attached to the threaded end of the soil-soaker or sprinkler. The cap, being rotatably mounted on the plate, permits the prongs, when the cap is screwed on tightly to the end of the soil-soaker, to be put in a vertical position for insertion into the ground.

The cap may be made of any durable material sufficiently strong to withstand the usage to which it may be put. The cap is of the same size and has the same thread as standard hose ends and caps and may, therefore, be easily affixed to the end of any soil-soaker or sprinkler-soaker.

2 denotes the prongs of the hold-down which are to be inserted into the ground to hold the end of the soil-soaker or sprinkler-soaker where desired. The prongs are pointed at the ends for easy insertion into the ground, and are made of any material, usually metal, which is sufficiently strong to withstand the stresses which may be put upon them.

The opening between the prongs is sufficient so that the soil-soaker or sprinkler-soaker may be wound up between them. The hold-down may remain attached at all times.

3 denotes the base of the hold-down to which the prongs and the cap are attached. The base is to be made of any material, metal or plastic, sufficiently strong to withstand the use to which it may be put.

The base and prongs are joined either by rolling, as shown, or by spot welding or fusing.

The base and cap may be joined by riveting, as shown, or by spot welding or fusing.

Since the base is the critical point of the jointure of the cap and prongs, the material used and the method of their affixing is critical and should be of sufficient tensile strength for the purpose intended.

4 denotes the rivet washer, if riveting is to be the method of joining the cap to the base; a bolt or spot welding may also join the cap to the base. It is essential, however, that the cap may be firmly, but adjustably affixed to the base so that the prongs may be rotated to an insertable vertical position, for general use.

The hold-down is for firmly stationing the far end of the soil-soaker or sprinkler-soaker into the earth through the insertion of the prongs. The hold-down has no connection or use with the hose itself since it is an insertable end-cap permitting no water to pass through it. It is entirely unrelated to any hose-holder or hose-connected device for the diffusion of water directly at the hose.

I claim:
1. A sprinkler-soaker support structure comprising a planar U-shaped rod support having a transverse bight portion and a pair of legs with pointed ends for insertion into the ground, a base plate mounted between said legs and secured thereto by extensions bent onto said legs and said bight portion, and a threaded hose-receiving cap rotatably mounted on said base plate.

2. The support structure of claim 1 wherein the cap is of metal.

3. The support structure of claim 1 wherein the cap is of suitable plastic material.

References Cited by the Examiner
UNITED STATES PATENTS

| | | | |
|---|---|---|---|
| 1,278,774 | 9/18 | Smith | 248—87 X |
| 1,763,119 | 6/30 | Archer | 239—276 X |
| 1,831,306 | 11/31 | Kakimoto | 248—85 X |
| 2,524,930 | 10/50 | Schleh | 248—87 |
| 2,631,061 | 3/53 | Nelson | 248—87 X |
| 2,807,505 | 9/57 | Weitzel | 239—145 |

CLAUDE A. LE ROY, *Primary Examiner.*